United States Patent

Enning et al.

[11] Patent Number: 5,316,367
[45] Date of Patent: May 31, 1994

[54] BEARING STRUCTURE FOR THE BODYWORK OF A VEHICLE

[75] Inventors: Norbert Enning, Denkendorf; Gundolf Kreis, Oberstimm; Alois Feldschmid; Christian Dornberg, both of Ingolstadt; Karl Reiter, Lenting; Heinrich Timm, Ingolstadt, all of Fed. Rep. of Germany

[73] Assignee: Audi AG, Ingolstadt, Fed. Rep. of Germany

[21] Appl. No.: 50,224

[22] PCT Filed: Dec. 6, 1991

[86] PCT No.: PCT/EP91/02335
§ 371 Date: May 5, 1993
§ 102(e) Date: May 5, 1993

[87] PCT Pub. No.: WO92/11166
PCT Pub. Date: Jul. 9, 1992

[30] Foreign Application Priority Data

Dec. 20, 1991 [DE] Fed. Rep. of Germany ....... 4041036

[51] Int. Cl.$^5$ .............................................. B62D 25/00
[52] U.S. Cl. ...................................... 296/189; 296/194
[58] Field of Search ................ 296/194, 189; 280/784, 280/785, 688, 710, 712

[56] References Cited

U.S. PATENT DOCUMENTS

| 2,026,658 | 1/1936 | Sherman | 280/106 |
| 4,618,163 | 10/1986 | Hasler et al. | 280/785 |
| 4,789,198 | 12/1988 | Ide | 296/194 |
| 5,031,958 | 7/1991 | Fujita et al. | 296/194 |
| 5,052,742 | 10/1991 | Akoshima et al. | 296/194 |
| 5,118,160 | 6/1992 | Kitagawa et al. | 296/189 |

FOREIGN PATENT DOCUMENTS

| 0146716 | 7/1985 | European Pat. Off. | B62D 23/00 |
| 916152 | 8/1954 | Fed. Rep. of Germany | B62D 21/02 |
| 1801960 | 8/1970 | Fed. Rep. of Germany | B62D 27/15 |
| 2713604 | 10/1978 | Fed. Rep. of Germany | B62D 25/08 |
| 2439124 | 5/1980 | France | B62D 25/08 |
| 1201253 | 8/1970 | United Kingdom | B67D 25/08 |

OTHER PUBLICATIONS

Aluminum-Zentrale e.v. Dusseldorf (Publisher), "Aluminum Und Kunststoff Im Verbund-Ein Schritt Zur Leichteren Autokarosserie", Aluminum Journal, vol. 64, No. 9 (1988).

Primary Examiner—Robert R. Song
Attorney, Agent, or Firm—Jacques M. Dulin; Tom C. Feix

[57] ABSTRACT

The invention comprises a bearing structure for the bodywork of a passenger car wherein front suspension strut mounts are arranged above front longitudinal bearers running down both sides of the vehicle body and are supported by vertical connecting members thereon. A hollow section bearer, acting as a suspension strut bearer, connects the suspension strut mount to a joining element (node) at the middle region of the forward doorpost. According to the invention, the suspension strut bearer is curved such that it will buckle due to a reduction in the radius of curvature in the event of a head-on collision. The buckling action of the suspension strut bearer reduces the force acting on the doorpost, thereby counteracting any possible stressing of the vehicle door. In a further embodiment of the invention, slots and/or notched grooves are provided in the side walls of hollow section bearer to promote the buckling process. In another alternate embodiment, the upper and lower walls of the hollow section bearer are configured as outwardly or inwardly pointed roof structures which act as hinge axes to collapsed the hollow section bearer inward onto itself during the buckling process.

23 Claims, 2 Drawing Sheets

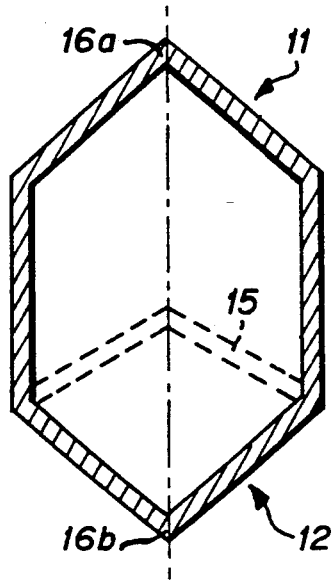
Fig_3
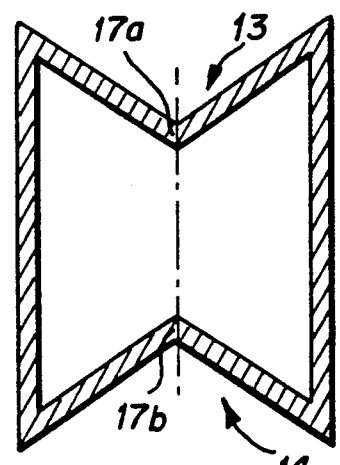
Fig_4
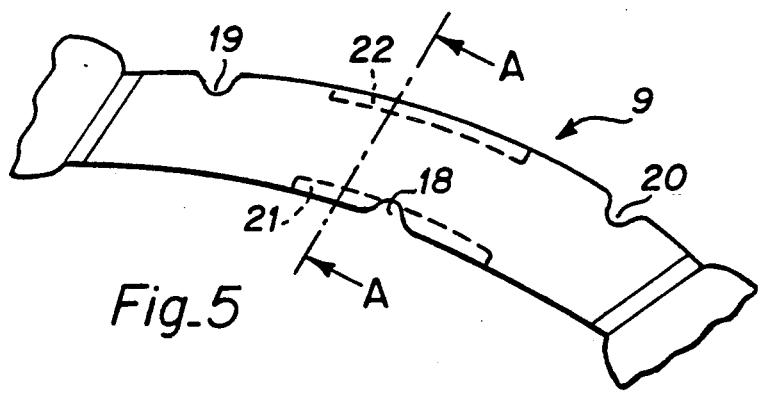
Fig_5
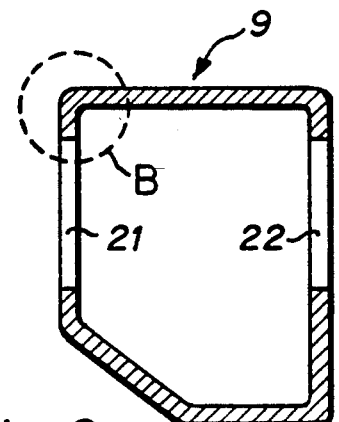
Fig_6 (A-A)
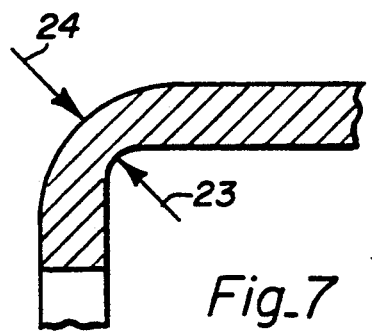
Fig_7 (B)

BEARING STRUCTURE FOR THE BODYWORK OF A VEHICLE

FIELD

The present invention concerns improvements relating to a front-end bearing structure for the bodywork of a motor vehicle and more particularly, but not exclusively passenger vehicles.

BACKGROUND OF THE INVENTION

The familiar front-end bearing structure of the bodywork of a passenger car comprises a pair of generally horizontal front longitudinal suspension strut bearers disposed spaced apart along opposite sides of the vehicle body, each of which include a suspension strut mount supported by an upright bearer connecting to a bottom longitudinal bearer.

The conventional self-supporting vehicle bodywork for passenger cars which include the front-end bearing structure of the type described above typically comprise sheet metal parts. For example, the hollow-section bearers are made from at least two deep-drawn metal sheet halves which are welded together. The suspension strut mounts, also made from sheet metal parts, are conventionally embedded in the bell structure of deep-drawn wheel housings. The wheel housings consist of open sheet metal shells which are connected to the underside of the longitudinal bearers. Applied force is guided across the sheet elements as thrust walls. The result is that the suspension strut mount is a heavily loaded and heavily stressed part of the body structure.

Accordingly, for the case of conventional sheet metal structures, the requisite rigidity for the bearing structure in this region, particularly for withstanding major damage in the event of a crash, can only be achieved through costly reinforcement measures. The steel sheets used to construct such self-supporting bodies are shaped in the deep drawing process. While dies used for shaping the sheets are relatively expensive, they do provide a cost-favorable solution for mass production since they permit large production runs. However, in view of the high investment on dies, the aforesaid process is very cost-intensive for smaller production runs.

A more cost-favorable solution for small production runs in particular, is known from European Patent document EP 0 146 716 wherein it is disclosed how to manufacture vehicle bodies for passenger cars having a bearing structure comprising of hollow sections which are joined together by node connector elements. The hollow sections are formed as extruded aluminum sections and the node connector elements are formed as light metal cast pieces. In addition to being a more cost-favorable solution for small production runs, the aluminum bodywork described in EP 0 146 716 is very lightweight and is more resistant to corrosion than a sheet metal bodywork. However, the suspension strut mount for this design and its support on the respective longitudinal bearer are also constructed from sheet metal parts in a manner similar to the conventional structure of the self-supporting sheet metal vehicle body described above. Accordingly, similar costly reinforcement measures must be taken to ensure adequate rigidity of the bearing structure in this case.

Another known vehicle bodywork having a bearing structure formed of extruded light metal hollow-section members which are joined together by light metal cast pieces is disclosed in an article entitled "Aluminum Und Kundstoff IM Verbund-ein Schritt Zur Leichteren Autokarosserie" appearing in Aluminum Journal 64, No. 9 (1988). The suspension strut mount is supported along its bottom surface on the respective longitudinal bearer across an extruded section bearer. Furthermore, a straight extruded section bearer formed as the suspension strut bearer is positioned between the suspension strut mount and the middle of the front door pillar or A-post at a height along the A-post adjacent the upper portion of the apron or fire wall. The connection of the suspension strut mount to the suspension strut bearer on the doorpost provides a stable support for the suspension strut mount. In the event of a forceful collision resulting in major deformation to the front end of the car, the suspension strut mount will be pushed backward in the longitudinal direction of the vehicle. The direct and straight connection of the suspension strut mount from the suspension strut bearer to the middle of the A-post results in a considerable amount of force being exerted on the A-post connection point during a frontal collision. As a result, the A-post will tend to curve or bend backward in the lengthwise direction of the vehicle thereby decreasing the width of the door opening. This presents a danger that the door will be difficult or even impossible to open. To avoid this problem, the suspension strut bearer may be dimensioned such that it is a very weak member in compression. However, this would unfavorably influence the desired rigidity for normal use. Alternatively, the A-post may be dimensioned as a disproportionately strong member such that it resists displacement when a lateral force is exerted thereagainst. However, this solution would unfavorably affect cost and weight.

British Patent document GB 1 201 253 discloses an example of a known bearer structure wherein supporting bearers extend from structural parts of the vehicle front end compartment to a transverse member disposed in front of the passenger compartment. The supporting bearers are constructed as yielding members capable of transmitting a compressive force up to a predetermined limit in the event of a frontal impact such that only slight force is transmitted to the passenger compartment. In a particular embodiment, the supporting bearers include curved regions and selectively positioned beads which promote buckling of the bearers upon frontal loading.

Furthermore, it is known from German Patent document DE 1 801 960 how to apply recesses and beads (grooves) to the side walls of a hollow bearer so that its length is shortened by folding upon axial loading on the hollow bearer.

THE INVENTION

Objects

It is an object of the invention to provide a simple and low cost front-end bearing structure for the bodywork of a passenger car which provides a rigid support for the suspension strut mount and which transmits the compression forces associated with a frontal impact to the passenger compartment in a safe manner to limit deformation of the A-post such that proper opening and closing operation of the passenger door is ensured.

It is another object of the invention to provide a front-end bearing structure of the type described which is fabricated from extruded light metal components and which is easily implemented in conventional bodywork designs which comprise light metal extruded sections joined together by node connector elements.

Other and further objects, features and advantages of the invention will become evident from the following detailed description, drawings and appended claims.

BRIEF DESCRIPTION OF THE DRAWINGS

The invention is best understood with reference to the drawings in which:

FIG. 3 is a cross section view through the hollow section of a first embodiment configuration of a suspension strut bearer;

FIG. 4 is a cross section view through the hollow section of a second embodiment configuration of a suspension strut bearer;

FIG. 5 is a top view of a suspension strut bearer in schematic representation illustrating the placement of beads disposed perpendicular to radius of curvature of the strut bearer;

FIG. 6 is a cross section view of the suspension strut bearer taken along the line and in the direction of arrows A—A of FIG. 5 showing recesses in the side walls; and FIG. 7 is an enlarged, fragmentary view of the circle region B in FIG. 6 illustrating a hollow section edge having reduced thickness of material as compared to the other wall thickness.

SUMMARY OF THE INVENTION

Figure 1:
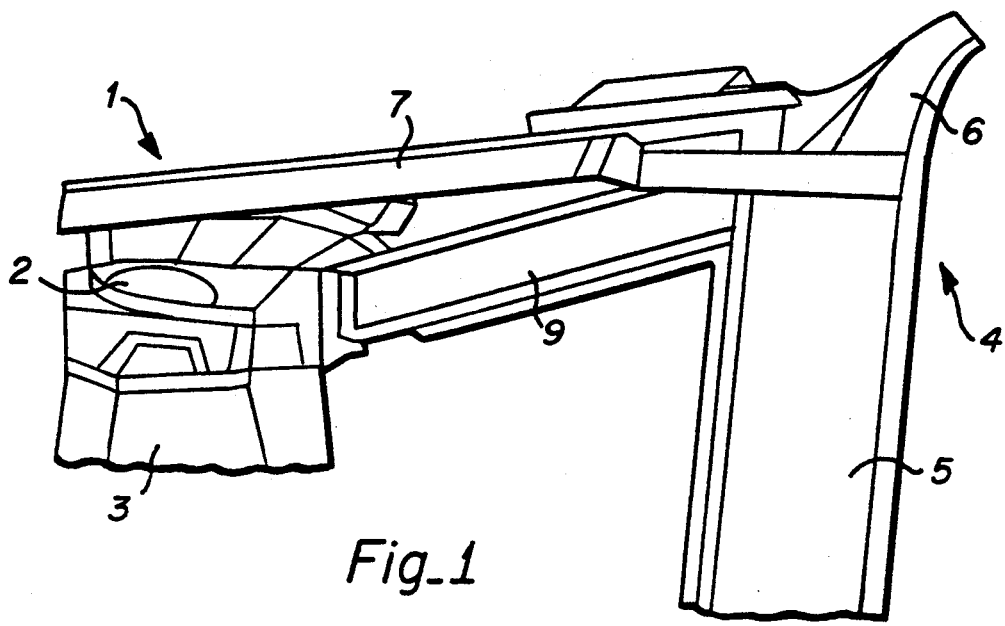
FIG. 1 is a side elevation view of a bearing structure of a bodywork of a passenger car in the region of one suspension strut mount.

The objects of the invention are achieved in part by providing a suspension strut which is curved between its first end connection from the suspension strut mount to its second end connection to the middle of door pillar or A-post. Furthermore, the suspension strut bearer is designed as a box section member having lower and upper walls aligned in an approximately horizontal plane and roughly vertically standing side walls which are shaped according to the desired curve. In one embodiment, the bearer is polygonal in cross section and the lower and/or upper walls are each configured as an outwardly pointed "A-frame" roof-type structure and in a second embodiment one or both of the pointed roof structures are retracted into the hollow section to form a trough. The suspension strut bearer is preferably formed as an extruded light metal section and the suspension strut mount is preferably formed as a light metal cast piece and forms a joining element for the suspension strut bearer.

In this way, the suspension strut bearer can be designed as a stable member having a relatively large cross section and wall thickness to provide a desired structural rigidity to the bearing structure in this region for normal usage. However, in the event of a frontal impact, the axial compression force acting on the suspension strut bearer is directed across the curve onto the middle of the A-post, such that under increasing load conditions, the curved suspension strut bearer bends such that its radius of curvature is decreased and thereby absorbing force that would normally cause deformation to the A-post. The suspension strut bearer will eventually buckle under a substantial deformation to the front of the car. Since the force necessary to cause the suspension strut bearer to buckle depends substantially on the size of the given curvature, the invention provides flexibility in selectively dimensioning the suspension strut bearer as desired.

The outwardly extended and/or inwardly retracted pointed roof/trough configurations for the lower and/or upper walls of the suspension strut bearer promote the buckling process of the suspension strut bearer in the event on a frontal collision, while at the same time provide a stable bearer section for normal usage. As the suspension strut bearer begins to buckle under the influence of a strong impact, the edges of the pointed roof or trough will act as hinges such that the hollow section collapses onto itself when relatively little force is applied. Again, it is easy to provide such lengthwise-folding edges in an extruded section. When compared to the conventional straight suspension strut bearer of the prior art, the pre-determined buckling of the suspension strut bearer of the invention transmits a substantially less amount of force to the A-post in the event of a frontal collision. Thus, even when dimensioned in a conventional manner, the A-post will not undergo heavy deformation to the extent that the door secured in the door opening becomes jammed.

In a preferred embodiment of the invention, the curvature for the suspension strut bearer is selected so that it is directly inwardly from the outwardly disposed suspension strutmount roughly towards the middle of the vehicle or the middle of the passenger compartment, as seen from above. In such an arrangement, there is usually room available for the suspension strut bearer and the buckling in the event of a frontal collision. A more favorable flow of force in this arrangement for the curvature is also achieved in view of the conventional placement of the A-post along the outer sides of the vehicle body, while the suspension strut mount is arranged more forward and more inward toward the longitudinal center axis of the vehicle. Thus, in the event of a frontal impact, the inwardly directed curvature of the suspension strut bearer produces a kind of bent lever, which is favorable for a buckling process. The same holds true where the curvature of the suspension strut bearer is outwardly directed as a result of structural circumstances.

In an alternative embodiment of the invention, additional measures are provided to improve the initiation of the buckling process for the suspension strut bearer in the event of a frontal collision whereby recesses are selectively placed in the walls of the suspension strut bearer at inside and/or outside locations along the curvature. Preferably, the recesses are designed as opposite lengthwise slots disposed approximately in the middle of the curvature.

In another alternative embodiment, a plurality of grooves, traveling perpendicular to the plane of the radius of curvature, are introduced into the walls of the suspension strut bearer. These grooves provide an additional measure for initiating the buckling process of the suspension strut mount with relatively little expenditure of force. The position placement of these grooves is preferably roughly at the middle of the inside of the curvature and at laterally spaced ends along the outside of the curvature.

The configuration of the suspension strut bearer having a box shape with the requisite stability according to the invention is especially well suited for fabrication as an extruded light metal hollow section and may be easily implemented in the exiting designs of known light metal vehicle bodywork constructions.

In the case of an extruded section, it is also easy to selectively thin wall thickness at the edges or corner regions of the hollow sections. Reduction of the material thickness at the edges of the hollow section favors the collapsing of the hollow section in the region of the curvature when a relatively low force is applied. This feature also provides another alternative or supplementary measure for promoting the buckling of the suspension strut bearer in the vent of a frontal collision.

DETAILED DESCRIPTION OF THE BEST MODE AND PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 2:
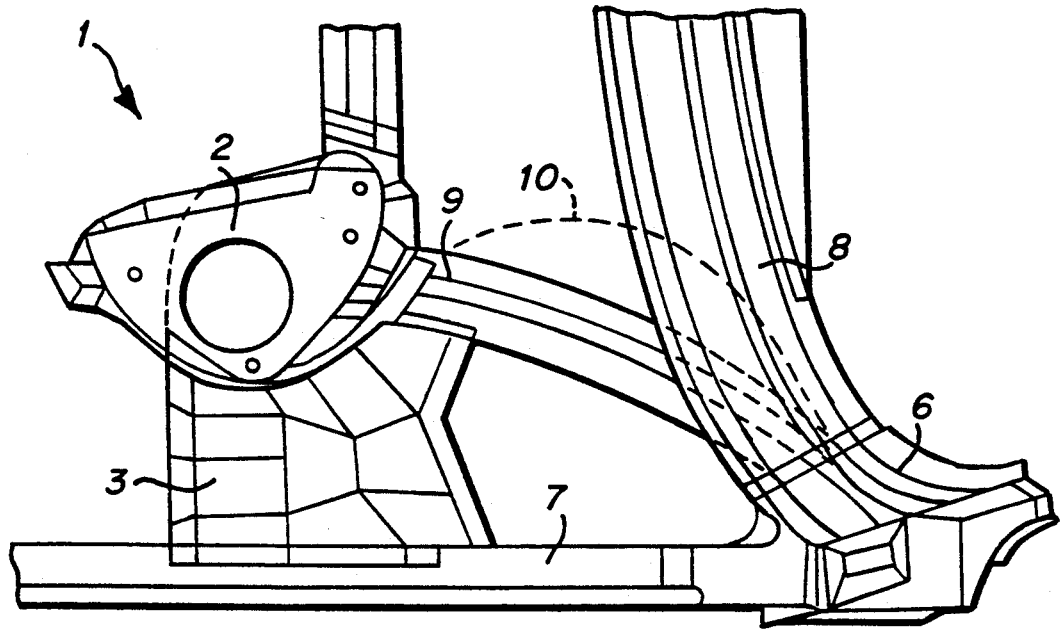
FIG. 2 is a top view of the region of the suspension strut mount shown in FIG. 1.

FIGS. 1 and 2 illustrate in side view and top view, respectively, a bearing structure 1 of a bodywork of a passenger car in the region of a suspension strut mount 2. The suspension strut mount 2 is supported by a bearing arrangement 3 on a lower front lengthwise bearer (not shown). The front doorpost, shown as an A-post 4, is divided along its middle region and consists of a lower extruded section piece 5 which is connected to a joining or node connector element 6. The node connector element 6 is preferably formed as a cast piece.

The node connector element 6 also connect together a forwardly-directed extruded section or fender bench 7, a transverse bearer 8 and an extruded section formed as the upper part of the A-post (not shown). The transverse bearer 8 is also preferably an extruded light metal section and forms the lower brace of the front window.

A suspension strut bearer 9, formed as an extruded light metal section, connects the suspension strut mount 2 to the node connector element 6. As is best seen is the top view of FIG. 2, unlike the conventional straight suspension strut bearers of the prior art, the suspension strut bearer 9 of the present invention exhibits a curvature directed inwardly toward the middle of the vehicle.

In the event of a frontal impact causing major deformation to the front of the car, the suspension strut mount 2 moves roughly backward in the lengthwise direction, i.e., to the right in FIG. 2. The inwardly directed curvature of the suspension strut bearer 9, either alone or in combination with other measures to be described in greater detail below, promotes a desired buckling of the suspension strut bearer 9 along the broken line 10 under heavy load, so that an excessively strong force is not exerted on the node connector element 6 which would otherwise likely deform the A-post and cause the passenger door to jam.

FIG. 3 shows a cross section view of a hollow section suspension strut bearer 9 configured in accordance with one embodiment of the present invention. The upper and lower walls 11 and 12 are arranged in the form of a pointed roof or "A-frame" structure such that they each form a center peak 16a and 16b, respectively.

FIG. 4 illustrates a second embodiment for the configuration of a suspension strut bearer 9 wherein the upper wall 13 and the lower wall 14 are retracted inside the hollow section such that they each form a gutter or trough 17a and 17b, respectively. The edges 16a, 16b and 17a and 17b of the roof configurations shown in FIGS. 3-4 function as hinges and cause the hollow section to collapse inward upon itself about the fold edges 16a, 16b or 17a, 17b as the suspension bearer 9 buckles under load. Thus, the structure of the hollow section presents only a slight resistance to the buckling process, such that only a slight force is transmitted to the node connector element 6 as the suspension strut bearer buckles during a frontal collision.

Any desired combination of these two roof configurations is also possible. For example, in FIG. 3 one wall 11 is shown in the form of a outwardly pointed roof while the other wall 15 (shown in phantom) may be retracted inward into the hollow section.

FIG. 5 shows another configuration of a suspension strut bearer 9 in top view, corresponding to the embodiment of FIG. 2. In this embodiment, a roughly perpendicular (i.e., transverse to the axial direction of the bearer 9) groove 18 is provided at the middle of the inside edge of the curvature and corresponding grooves 19 and 20 are formed at opposite ends along the outside edge of the curvature such that they are laterally displaced from the inwardly disposed center groove 18. These grooves 18-20 also reduce the force necessary to initiate the buckling process of the suspension strut bearer 9.

FIG. 6 shows a cross section view of the suspension strut bearer 9 taken along the line and in the direction of arrows A—A of FIG. 5. The suspension strut bearer 9 has a roughly rectangular profile and includes a pair of spaced apart recesses 21, 22 in the form of lengthwise slots disposed on opposite side walls. These slot recesses 21, 22, are also shown in phantom in FIG. 5. The opposite recesses 21, 22 disposed along the side walls also promote the buckling processes in a manner similar to the grooves 18-20 described in FIG. 5. Unlike the side walls, the upper and lower walls are preferably formed without recesses such that they form a stable upper and lower flange to ensure good support.

FIG. 7 shows a magnified corner region B of the section of FIG. 6. As can be seen, the inside radius 23 is relatively smaller than the outside radius 24. This results in a reduced material thickness at the edge as compared to the rest of the wall. The thinning of material at the corner also facilitates the controlled collapse of the hollow section upon buckling of the suspension strut bearer 9. Thus, the suspension strut bearer 9 can be selectively configured to provide only slight resistance to buckling even when only a small amount of force is applied. Thinning the material at the edges of the section is also possible as a supplementary, supporting measure at the edges 16a, 16b and 17a, 17b of the configurations of FIGS. 3-4.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An improved front-end bearing structure in the bodywork of a vehicle of the type which includes a front suspension mount disposed above and supported on a lower front longitudinal bearer, a front door post disposed rearward of the front suspension mount and having a node connector element disposed along a mid portion thereof at a height adjacent an upper portion of a fire wall dividing the engine compartment from the passenger compartment and a suspension strut bearer for bracing the front suspension mount to the front door post at the node connector element, the improvement which comprises:

a) a suspension strut bearer formed as a hollow section member generally polygonal in cross section and having a curvature in a lengthwise direction such that the suspension strut bearer buckles by a reduction of the radius of curvature in the event a frontal collision of the vehicle and thereby preventing deformation to the front door post.

2. An improved front-end bearing structure in a vehicle as in claim 1 wherein said hollow section member curves inwardly towards a center longitudinal axis of the vehicle from said front door post to said suspension strut mount when seen in top view.

3. A improved front-end bearing structure in a vehicle as in claim 2 wherein said suspension strut bearer includes substantially vertically oriented side walls which form inner and outer curves of said suspension strut bearer.

4. An improved front-end bearing structure in a vehicle as in claim 3 wherein each of said suspension strut bearer includes means for promoting buckling.

5. An improved front-end bearing structure in a vehicle as in claim 4 wherein said means for promoting buckling includes at least one of the group consisting of:

a) center fold edges formed in said upper and lower walls of said suspension strut bearer;
b) a plurality of grooves transverse to the axial direction of said suspension strut bearer and selectively disposed along at least one of said inner or outer curves of said suspension strut bearer;
c) at least one lengthwise slot formed along a middle portion of at least one of said inner and outer curves of said suspension strut bearer; and
d) a reduction in wall thickness in at least one corner region of said suspension strut bearer to facilitate a controlled collapse of said suspensions strut bearer.

6. An improved front-end bearing structure in a vehicle as in claim 5 wherein:

a) said suspension strut bearer is formed as an extruded light metal section; and
b) said suspension strut mount and said node connector element are formed as cast light metal parts.

7. An improved front-end bearing structure in a vehicle as in claim 4 wherein said means for promoting buckling includes:

a) center fold edges formed in said upper and lower walls of said suspension strut bearer; and
b) at least one of said fold edges of said upper and lower walls forms a peak of an outwardly pointed roof structure.

8. An improved front-end bearing structure in a vehicle as in claim 7 wherein said means for promoting buckling further includes at least one of the group consisting of:

a) a plurality of grooves transverse to the axial direction of said suspension strut bearer and selectively disposed along at least one of said inner or outer curves of said suspension strut bearer;
b) at least one lengthwise slot formed along a middle portion of at least one of said inner and outer curves of said suspension strut bearer; and
c) a reduction in wall thickness in at least one corner region of said suspension strut bearer to facilitate a controlled collapse of said suspension strut bearer.

9. An improved front-end bearing structure in a vehicle as in claim 8 wherein:

a) said suspension strut bearer is formed as an extruded light metal section; and
b) said suspension strut mount and said node connector element are formed as cast light metal parts.

10. An improved front-end bearing structure in a vehicle as in claim 4 wherein said means for promoting buckling includes:

a) center fold edges formed in said upper and lower walls of said suspension strut bearer; and
b) at least one of said center fold edges of said upper and lower walls forms a trough for an inwardly retracted roof structure.

11. An improved front-end bearing structure in a vehicle as in claim 10 wherein said means for promoting buckling further includes at least one of the group consisting of:

a) a plurality of grooves transverse to the axial direction of said suspension strut bearer and selectively disposed along at least one of said inner or outer curves of said suspension strut bearer;
b) at least one lengthwise slot formed along a middle portion of at least one of said inner and outer curves of said suspension strut bearer; and
c) a reduction in wall thickness in at least one corner region of said suspension strut bearer to facilitate a controlled collapse of said suspension strut bearer.

12. An improved front-end bearing structure in a vehicle as in claim 4 wherein:

a) said suspension strut bearer is formed as an extruded light metal section; and
b) said suspension strut mount and said node connector element are formed as cast light metal parts.

13. An improved front-end bearing structure in a vehicle as in claim 4 wherein said means for promoting buckling includes a plurality of grooves transverse to the axial direction of said suspension strut bearer and selectively disposed along said inner and outer curves of said suspension strut bearer and wherein:

a) at least one grooves is disposed in a middle region said inner curve; and
b) at least two grooves are disposed at opposite ends along said outer curve.

14. An improved front-end bearing structure in a vehicle as in claim 13 wherein said means for promoting buckling further includes at least one of the group consisting of:

a) center fold edges formed in said upper and lower walls of said suspension strut bearer;
b) at least one lengthwise slot formed along a middle portion of at least one of said inner and outer curves of said suspension strut bearer; and
c) a reduction in wall thickness in at least one corner region of said suspension strut bearer to facilitate a controlled collapse of said suspension strut bearer.

15. An improved front-end bearing structure in a vehicle as in claim 14 wherein:

a) said suspension strut bearer is formed as an extruded light metal section; and
b) said suspension strut mount and said node connector element are formed as cast light metal parts.

16. An improved front-end bearing structure in a vehicle as in claim 4 wherein said means for promoting buckling include:

a) at least one lengthwise slot formed along a middle portion of at least one of said inner and outer curves of said suspension strut bearer.

17. An improved front-end bearing structure in a vehicle as in claim 16 wherein said means for promoting buckling further includes at least one of the group consisting of:
  a) center fold edges formed in said upper and lower walls of said said suspension strut bearer;
  b) a plurality of grooves transverse to the axial direction of said suspension strut bearer and selectively disposed along at least one of said inner or outer curves of said suspension strut bearer; and
  c) a reduction in wall thickness in at least one corner region of said suspension strut bearer to facilitate a controlled collapse of said suspension strut bearer.

18. An improved front-end bearing structure in a vehicle as in claim 17 wherein:
  a) said suspension strut bearer is formed as an extruded light metal section; and
  b) said suspension strut mount and said node connector element are formed as cast light metal parts.

19. An improved front-end bearing structure in a vehicle as in claim 4 wherein said means for promoting buckling includes a reduction in wall thickness in at least one corner region of said suspension strut bearer to facilitate a controlled collapse of said suspension strut bearer.

20. An improved front-end bearing structure in a vehicle as in claim 19 wherein said means for promoting buckling further includes at least one of the group consisting of:
  a) center fold edges formed in said upper and lower walls of said suspension strut bearer;
  b) a plurality of grooves transverse to the axial direction of said suspension strut bearer and selectively disposed along at least one of said inner or outer curves of said suspension strut bearer; and
  c) at least one lengthwise slot formed along a middle portion of at least one of said inner and outer curves of said suspension strut bearer.

21. An improved front-end bearing structure in a vehicle as in claim 20, wherein:
  a) said suspension strut bearer is formed as an extruded light metal section; and
  b) said suspension strut mount and said node connector element are formed as cast light metal parts.

22. An improved front-end bearing structure in the bodywork of a vehicle fabricated from light metal components of the type which includes a front suspension mount disposed above and supported on a lower front longitudinal bearer, a front door post disposed rearward of the front suspension mount and having a node connector element disposed along a mid portion thereof at a height adjacent an upper portion of a fire wall dividing the engine compartment from the passenger compartment and a suspension strut bearer for bracing the front suspension mount to the front door post at the node connector element, the improvement which comprises:
  a) a suspension strut bearer formed as an extruded light metal hollow section member generally polygonal in cross section and having a curvature in a lengthwise direction such that the suspension strut bearer buckles by a reduction of the radius of curvature in the event of a frontal collision of the vehicle and thereby preventing deformation to the front door post.

23. An improved front-end bearing structure of a vehicle as in claim 22 wherein said suspension strut bearer includes means for promoting buckling of said suspension strut bearer in the event of a frontal collision.

* * * * *